(12) United States Patent
Davidian (10) Patent No.: US 12,196,487 B2
(45) Date of Patent: Jan. 14, 2025

(54) PLANT AND PROCESS FOR AERIAL GAS SEPARATION USING A PARALLELEPIPEDAL ADSORBER

(71) Applicant: L'Air Liquide, Societe Anonyme pour l'Etude et l'Exploitation des Procedes Georges Claude, Paris (FR)

(72) Inventor: Benoit Davidian, Champigny-sur-Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 716 days.

(21) Appl. No.: 17/432,897

(22) PCT Filed: Feb. 12, 2020

(86) PCT No.: PCT/FR2020/050253
§ 371 (c)(1),
(2) Date: Aug. 20, 2021

(87) PCT Pub. No.: WO2020/169900
PCT Pub. Date: Aug. 27, 2020

(65) Prior Publication Data
US 2022/0196326 A1 Jun. 23, 2022

(30) Foreign Application Priority Data
Feb. 21, 2019 (FR) ...................... 1901732

(51) Int. Cl.
*F25J 3/04* (2006.01)
*B01D 53/04* (2006.01)

(52) U.S. Cl.
CPC ...... *F25J 3/04169* (2013.01); *B01D 53/0407* (2013.01); *B01D 53/0462* (2013.01);
(Continued)

(58) Field of Classification Search
CPC ............ B01D 53/0407; B01D 53/0415; B01D 53/0446; B01D 53/0462; F25J 3/04169;
(Continued)

(56) References Cited

U.S. PATENT DOCUMENTS

| 4,049,406 A * | 9/1977 | Rivers ................ B01D 53/0446 |
| | | 976/DIG. 380 |
| 5,176,721 A | 1/1993 | Hay et al. |

(Continued)

FOREIGN PATENT DOCUMENTS

| DE | 91 00 168 | 3/1991 |
| EP | 0 789 208 | 8/1997 |

(Continued)

OTHER PUBLICATIONS

International Search Report and Written Report for PCT/FR2020/050245, mailed May 15, 2020.
(Continued)

*Primary Examiner* — Robert Clemente
(74) *Attorney, Agent, or Firm* — Justin K. Murray (57) ABSTRACT

A plant for separating gases from the air comprises, in the direction of circulation of the stream of air: a compression means for compressing the stream of air to a pressure P1 of between 1.15 bar abs and 2 bar abs, a TSA adsorption unit, and a cryogenic distillation unit, with the adsorption unit comprising at least two adsorbers A1 and A2 each having a parallelepipedal casing arranged horizontally and comprising: an air stream inlet and outlet, two fixed bed adsorbent masses each likewise parallelepipedal with faces parallel to the faces of the casing, and a set of volumes allowing the stream of air to traverse the two adsorbent masses horizontally, in parallel, over the whole cross section of each of the adsorbent masses and throughout their thicknesses.

16 Claims, 8 Drawing Sheets

(52) U.S. Cl.
CPC ....... *F25J 3/04775* (2013.01); *F25J 3/04866* (2013.01); *B01D 2257/504* (2013.01); *F25J 2205/60* (2013.01); *F25J 2290/12* (2013.01)

(58) Field of Classification Search
CPC ... F25J 3/04775; F25J 3/04866; F25J 2205/60
See application file for complete search history.

(56) References Cited

U.S. PATENT DOCUMENTS

| | | | |
|---|---|---|---|
| 5,735,142 | A | 4/1998 | Grenier |
| 6,059,863 | A | 5/2000 | Monreau et al. |
| 6,402,809 | B1 | 6/2002 | Monereau et al. |
| 9,358,496 | B2 | 6/2016 | Berges et al. |
| 2005/0217481 | A1 | 10/2005 | Dunne et al. |
| 2006/0210454 | A1 | 9/2006 | Saxena et al. |
| 2012/0058017 | A1 | 3/2012 | Furuyama et al. |
| 2012/0167622 | A1 | 7/2012 | Cognard et al. |
| 2017/0216760 | A1 | 8/2017 | Le Bot et al. |
| 2018/0126319 | A1 | 5/2018 | Ferstl et al. |
| 2019/0137174 | A1 | 5/2019 | Cavagne et al. |

FOREIGN PATENT DOCUMENTS

| | | |
|---|---|---|
| EP | 1 080 773 | 3/2001 |
| EP | 2 752 232 | 7/2014 |
| FR | 2 767 716 | 3/1999 |
| FR | 2 949 846 | 3/2011 |
| FR | 2 981 280 | 4/2013 |
| FR | 3 052 242 | 12/2017 |
| JP | 3 065 534 | 7/2000 |

OTHER PUBLICATIONS

French Search Report and Written Opinion for FR 1 901 731, mailed Dec. 4, 2019.
International Search Report and Written Report for PCT/FR2020/050253, mailed May 15, 2020.
French Search Report and Written Opinion for FR 1 901 732, mailed Oct. 14, 2019.
International Search Report and Written Report for PCT/FR2020/050252, mailed May 13, 2020.
French Search Report and Written Opinion for FR 1901734, mailed Nov. 20, 2019.

* cited by examiner

PLANT AND PROCESS FOR AERIAL GAS SEPARATION USING A PARALLELEPIPEDAL ADSORBER

CROSS REFERENCE TO RELATED APPLICATIONS

This application is a § 371 of International PCT Application PCT/FR2020/050253, filed Feb. 12, 2020, which claims the benefit of FR1901732, filed Feb. 21, 2019, both of which are herein incorporated by reference in their entireties.

FIELD OF THE INVENTION

The present invention relates to a plant for aerial gas separation and to the process for aerial gas separation using said plant. More specifically, it relates to purifying the atmospheric air before separation of said air by cryogenic distillation.

BACKGROUND OF THE INVENTION

It is known that atmospheric air contains compounds that must be removed before it is introduced into the heat exchangers of the cold box of an air separation unit, particularly water vapor ($H_2O$), carbon dioxide ($CO_2$), nitrogen oxides and hydrocarbons.

In the absence of such treatment of the air in order to remove its $H_2O$ and $CO_2$ impurities, these impurities solidify when the air is cooled to cryogenic temperature, typically below $-150°$ C., which can result in problems of the equipment becoming clogged, particularly the heat exchangers, distillation columns, etc.

In addition, it is also customary to at least partially remove the hydrocarbon and nitrogen oxide impurities that can be present in the air in order to prevent the excessive concentration thereof in the bottom of the distillation column(s), and thus mitigate any risk of damage to the equipment.

This pretreatment of the air is currently carried out, as applicable, using the PSA (Pressure Swing Adsorption) process or the TSA (Temperature Swing Adsorption) process. These processes differ in the way in which the adsorbent is regenerated: a pressure effect if said regeneration takes place due to pressure lower than the adsorption pressure, or a temperature effect when it takes place at a temperature higher than the adsorption temperature. It should be noted that there can also be a pressure reduction effect in a TSA unit and that various names can be used in this case. In this document, the term "TSA" is used when a temperature effect is used for regeneration, whether or not there is an additional effect linked to pressure.

Conventionally, a TSA process air purification cycle includes the following steps:
 Purifying the air at above-atmospheric pressure and ambient temperature, optionally of the order of 5 to 10° C. if refrigeration means are used upstream of the unit,
 Depressurizing the adsorber to atmospheric pressure,
 Regenerating the adsorbent at atmospheric pressure, particularly using impure nitrogen coming from the air separation unit and heated to a temperature usually between 90 and 250° C. by means of an exchanger, generally an electric heater or a steam heater,
 Cooling the adsorbent to ambient temperature, particularly by continuing to introduce into it said waste gas originating from the air separation unit, but unheated,
 Repressurizing the adsorber with atmospheric air or purified air, for example originating from the adsorber that is in the production phase.

Generally, air pretreatment plants comprise two adsorbers, operating alternately, that is, one of the adsorbers is in the production phase while the other is in the regeneration phase.

Additional steps to those described above can be added, such as a step of placing the two adsorbers in parallel, of varying duration, that is, from a few seconds to several minutes, or a waiting step without the circulation of fluids through the adsorbent, for example at the end of the regeneration step.

As pressure facilitates the capture of the impurities, the purification unit is generally installed after compression, that is, at a pressure greater than 3 bar abs, frequently at a pressure greater than 4.5 bar abs. This pressure depends on the cryogenic cycle applied for air separation.

The most commonly used cycle is the conventional dual column cycle, in which the air is compressed to a single pressure that corresponds, excluding head losses, to the operating pressure of the so-called medium-pressure column, that is, very generally between 4.5 and 6 bar abs.

More complex cryogenic cycles exist in which the air is used at both medium (MP, typically 4.5 to 9 bara) and high (HP, typically 10 to 65 bara, or even 90 bara) pressures. The highest pressure is obtained either by compressing the appropriate fraction of the medium-pressure air again or by using two compressors (MP, HP) compressing the atmospheric air to the required pressures. It is possible to use two purification units, an MP unit for the fraction of the air directly used at this pressure and an HP unit for the part compressed to high pressure, in order to minimize the volume of adsorbent to be used. This solution is proposed in FR 2949846, with the first pressure between 5 and 9 bar abs, or even between 2 and 4 bar abs. However, for the sake of simplicity and generally due to a smaller investment, the solution that consists of purifying all of the air at MP is usually applied. One example of this type of cycle is described in EP 0 789 208 B1, see in particular FIG. 1, with an MP pressure, after the first compression, of 5 to 6 bar. Fractions of the air purified in this way are then boosted.

It will be appreciated that although pressure promotes adsorption, it requires in exchange greater mechanical strength of the equipment related to purification, in particular of the casings of the adsorbers. Several types of adsorber are used for this air purification application: cylindrical adsorber with a vertical axis, cylindrical adsorber with a horizontal axis, radial adsorber. It will be noted that all of the ferrules used are cylindrical. This is because a cylinder is much more resistant to internal pressure than flat surfaces.

As the energy consumed for air separation is essentially linked to the energy necessary for compressing the air, the head losses must be minimized all along the circuits that have an influence on this pressure in order to obtain an optimum specific separation energy. The head losses through the purification of the air are a not insignificant part of the irreversibilities of the process. There has therefore been an underlying tendency to develop adsorbers having a minimum brake on the circulation of the fluids. The use of the adsorbent in a thin layer and with a large flow area is one of the solutions generally applied regardless of the type of adsorber, but such a choice has drawbacks.

Figure 1:
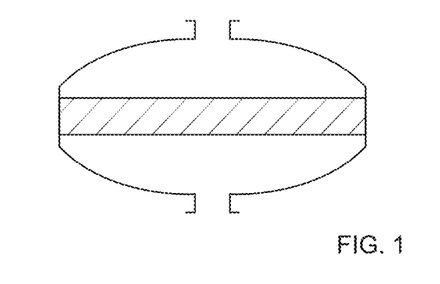
FIG. 1 shows an embodiment of the prior art.
Figure 1B:
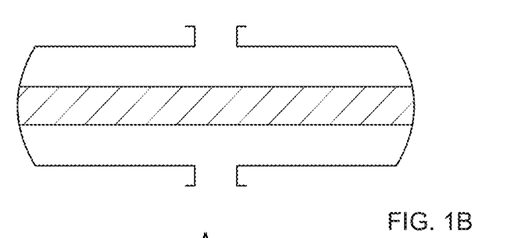
Figure 1C:
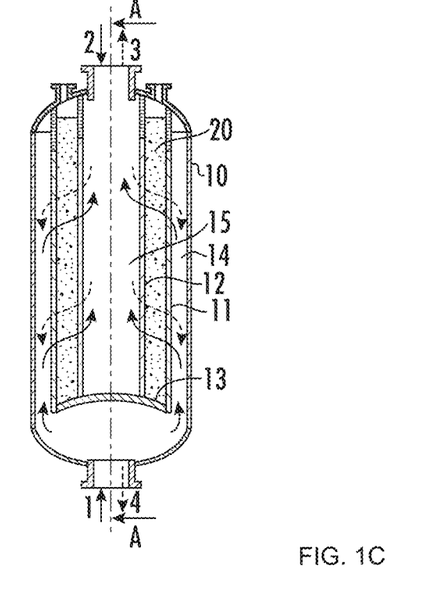

As shown schematically in FIG. 1, such an arrangement results in large dead volumes on either side of the adsorbent volume. Diagrams 1 A, B and C respectively show cylindrical adsorbers with a vertical axis and a horizontal axis, and a radial adsorber. When they are used in thin layers, the adsorbent volumes only represent a fraction of the total internal volume of the adsorber, generally less than 50%. This fraction tends to decrease when the size of the adsorbers is increased. Part of these dead volumes is necessary to ensure satisfactory distribution of the air and regeneration gas through the adsorbent volume. As mentioned at the beginning of the document, very fine purification of the various impurities is sought for this application, in particular for hydrocarbons, especially for propane, and nitrogen oxides, generally well below one ppm (part per million). This results in large distribution zones at the inlet and outlet of the adsorber in order to have uniform distribution. This also requires particularly small filling tolerances in order to have adsorbent layers of the same thickness and the same density (or the same void fraction), regardless of the path of the fluids through the adsorbent, in order to avoid any air bypass that would pollute production before the end of the purification step.

It will be noted that in the case of radial beds, due to the use of concentric cylindrical meshes, practically identical bed thicknesses can be obtained, to within manufacturing tolerances. Conversely, in the case of cylindrical adsorbers with a vertical or horizontal axis, the free surfaces must be very flat after filling and it must be ensured that they stay that way during operation. On areas that can exceed 10 m2, this requires appropriate installation procedures and/or devices.

Although cylindrical adsorbers can be filled relatively efficiently and uniformly due to their geometry, the same is not always true of radial beds, for which equipment developed specially to this end must generally be used and/or removable equipment must be provided in the top part.

This results in a relatively large investment for this medium-pressure purification, because of the volume of the casing, the thickness of the wall and, when good distribution of the fluids is required through thin beds, the appropriate plant that must be provided. There have therefore been a number of developments in order to attempt to reduce this cost, in particular proposals to use atmospheric-pressure purification units to replace MP purification or at least to reduce the size thereof.

In particular, systems have been developed with total or partial atmospheric-pressure air purification situated at the intake of the air compressor.

US 2005/0217481 describes such a system using a technology made possible by low pressure, namely Low Pressure Rotary Adsorbent Contactors. This process is said to be suitable for air purification before cryogenic separation. When ultra-high purity is sought, three plants in series must be used.

Still using rotary adsorbent contactor technology, placing a rotary system in series, before compression, intended to remove the majority of the moisture, followed by conventional purification to remove the residual impurities, has been envisaged. Reference can be made to US 2017/0216760 which describes such a dual system, albeit applied to a VPSA.

It should be noted that rotary systems were initially developed to remove some of the moisture from the air at atmospheric pressure in an air conditioning process, and not for fine purification. For this latter application, they must be adapted by increasing the sealing, both between fluids and to the outside, and increasing the number of stages in series. Industrial production for the application envisaged has yet to occur to our knowledge.

These problems of sealing rotary systems are increasingly troublesome the further away one moves from atmospheric pressure.

It should be noted here that lowering the adsorption pressure from MP to atmospheric pressure has a two-fold, or even three-fold, negative impact. For the same content, the quantity adsorbed is substantially lower, and this is particularly true for CO2, traces of hydrocarbons and nitrogen oxides. This leads to a first increase in the adsorbent volume. The quantity of water to be captured in atmospheric air is very substantially greater than in MP air. A large part of the water is removed in liquid form at the outlet of the aftercooler of the air compressor in the MP solution. This results in a significant increase in the volume of desiccant. However, the adsorption of this water also results in the heating of the air circulating through the adsorbent, again reducing the capacity to adsorb CO2 and other impurities.

In practice, this means that solutions that consist of carrying out air purification at atmospheric pressure are not entirely satisfactory and are used very little. The potential savings on material and technology linked to the use of low pressure are entirely offset by the difficulties that low pressure causes in the capture of impurities.

Hybrid solutions have therefore also been proposed, with partial purification at atmospheric pressure followed by final purification at medium pressure. The final purification unit is smaller than a conventional solution but having to use two units offsets the benefits that could be expected from such a reduction.

Ultimately, there is currently no purification process that is able to benefit from low-pressure technology and MP purification.

SUMMARY OF THE INVENTION

One solution of the present invention is a plant for aerial gas separation comprising, in the direction of circulation of the air stream:
- compression means C that make it possible to compress the air stream to a pressure P1 of between 1.15 bar abs and 2 bar abs,
- a TSA unit A, and
- a cryogenic distillation unit D,
- with the adsorption unit comprising at least two adsorbers A1 and A2 each having a parallelepipedal casing arranged horizontally and comprising:
  - an air stream inlet and outlet,
  - two fixed bed adsorbent masses, each also parallelepipedal, the faces of which are parallel to the faces of the casing, and
  - a set of volumes allowing the air stream to pass through the two adsorbent masses horizontally, in parallel, over the entire cross-section of each of the adsorbent masses and throughout their thicknesses.

Hereinafter, the length of the adsorber A will be denoted as L, its height as H and its width as l. The cross-section of the adsorbent mass also has a length L and a height H.

The choice of pressure P1 is fundamental in the context of the invention. This pressure must be sufficiently low to permit low-pressure technology for the adsorbers, that is, in practice, adsorber casings with flat surfaces and not cylindrical casings, but also be substantially higher than atmospheric pressure in order to limit the negative effects listed above. A pressure of 1.5 bar abs for example makes it possible to use parallelepipedal adsorbers, optionally with some reinforcements on the flat surfaces. It also allows a very appreciable improvement compared to an atmospheric pressure solution. The partial pressures of the impurities increase by 50% and, as these impurities are in the form of traces, the adsorption capacity of the adsorbents used also increases, by 50% as an initial approximation. The quantity of water that can be introduced is smaller and the corresponding rise in temperature is smaller.

For the same adsorption time, purification at 1.5 bar abs produces markedly greater volumes than MP purification at 3 or 4 bar, but is also far more effective than purification at atmospheric pressure. The use of low-pressure technology for the casing can thus tip the balance in favor of the solution according to the invention.

Passage through the adsorbent masses preferably takes place in opposite directions.

Here, fixed bed is given to mean that the adsorbent, whether in the form of particles (beads, sticks, granules, wafers, etc.) or structured adsorbent such as for example monolithic, is immobile in a casing that is itself immobile. This excludes any solution in which the adsorbent is mobile and in particular any rotary system such as rotary contact or barrel systems (process in which it is the casings containing the adsorbent that are mobile).

It will be noted that the parallelepipedal shape of the adsorber casings A and B allows for dense, uniform filling of each adsorber without having to use a complex filling system.

Depending on the case, the plant according to the invention can have one or more of the features below:

said plant comprises, between the compression means C and the cryogenic distillation unit D, a single adsorption unit.

the set of volumes comprises:

an internal part comprising:

a first volume V1 7 for the introduction and distribution or recovery of fluids;

a second volume V2 8 and a third volume V3 9 each comprising an adsorbent mass and situated on either side of the first volume V1; and a free part comprising two volumes V4 and V5 11 for the introduction and distribution or recovery of fluids located on either side of the internal part and between the internal part and the adsorber casing;

with the internal part arranged symmetrically relative to the mid-plane of the adsorber casing.

the second volume V2 and the third volume V3 each comprise at least two adjacent sub-volumes comprising different adsorbents, with all of the adsorbents arranged symmetrically relative to the mid-plane of the adsorber.

the first volume V1, the second volume V2 and the third volume V3 have vertical walls sealably fixed to the top wall and the bottom wall of the adsorber casing.

the internal part has a solid bottom end and/or a solid top end and the first volume V1, the second volume V2 and the third volume V3 have vertical walls sealably fixed to the top wall of the adsorber casing or to the solid top end and to the bottom wall of the adsorber casing or to the solid bottom end.

the set of volumes comprises, between the bottom wall of the adsorber casing and the solid bottom end, a space in fluid communication with volumes V4 and V5.

the set of volumes comprises, between the top wall of the adsorber casing and the solid top end, a space in fluid communication with volumes V4 and V5.

the first volume V1, the second volume V2 and the third volume V3 have vertical walls sealably fixed to at least one lateral wall of the adsorber casing.

the first volume V1, the second volume V2 and the third volume V3 have vertical walls sealably fixed to at least one solid plate parallel to a lateral wall of the adsorber casing.

the set of volumes comprises, between the solid plate and a lateral wall of the adsorber casing, a space in fluid communication with volumes V4 and V5.

the second volume V2 and the third volume V3 each comprise a plurality N (N between 1 and 4, preferably N=2) of adjacent sub-volumes, and each of these volumes can contain a different adsorbent, all of these adsorbents being arranged symmetrically relative to the mid-plane of the adsorber; preferably, these different adsorbents will be separated by fluid-porous vertical walls. These vertical walls can then, as above, be sealably fixed to the top wall of the adsorber casing or to the solid top end and to the bottom wall of the adsorber casing or to the solid bottom end.

the second volume V2 and the third volume V3 comprise, over the entire length of their top end, a system suitable for preventing potential local pollution of the purified air.

the first volume V1 and the two volumes V4 and V5 have means making it possible to introduce and extract the different fluids circulating in the adsorber; preferably, these fluid introduction and extraction means are on a single face of the parallelepipedal adsorber casing.

The present invention also relates to a process for aerial gas separation from an air stream containing at least one impurity selected from water vapor, carbon dioxide, nitrogen oxides and hydrocarbons, using a plant as defined above and comprising the following successive steps:

a) compressing (1) the air stream to a pressure P1 of between 1.15 bar abs and 2 bar abs, b) purifying the compressed air stream, by adsorption using the TSA unit (2) so as to remove at least one impurity contained in the air stream, and c) separating the constituents of the air stream by cryogenic distillation using the unit (3), with all of step b) carried out at the pressure P1.

As appropriate, the process according to the invention can have one or more of the following features:

the pressure P1 is between 1.15 bar abs and 1.5 bar abs, preferably between 1.20 bar abs and 1.30 bar abs.

the process uses a plant comprising a set of volumes with the internal part and the free part as defined above, and in step b) the air stream is introduced into the two volumes V4 and V5 and the purified air stream is withdrawn from volume V1.

the process uses a plant comprising a set of volumes with an internal part comprising a top or bottom end, a space between the end and the casing and a free part, these parts being as defined above, and in step b) the air stream is introduced into the space in fluid communication with volumes V4 and V5 and the purified air stream is withdrawn from volume V1.

the process uses a plant comprising a set of volumes with the internal part and the free part as defined above and comprises a step d) of regenerating the TSA unit 2 in which the gas is introduced into volume V1 and then withdrawn from the two volumes V4 and V5.

the process uses a plant comprising a set of volumes with an internal part comprising a top or bottom end, a space between the end and the casing and a free part, these parts being as defined above, and comprises a step d) of regenerating the TSA unit 2 in which the gas is introduced into volume V1 and then withdrawn from the space in fluid communication with volumes V4 and V5.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 2:
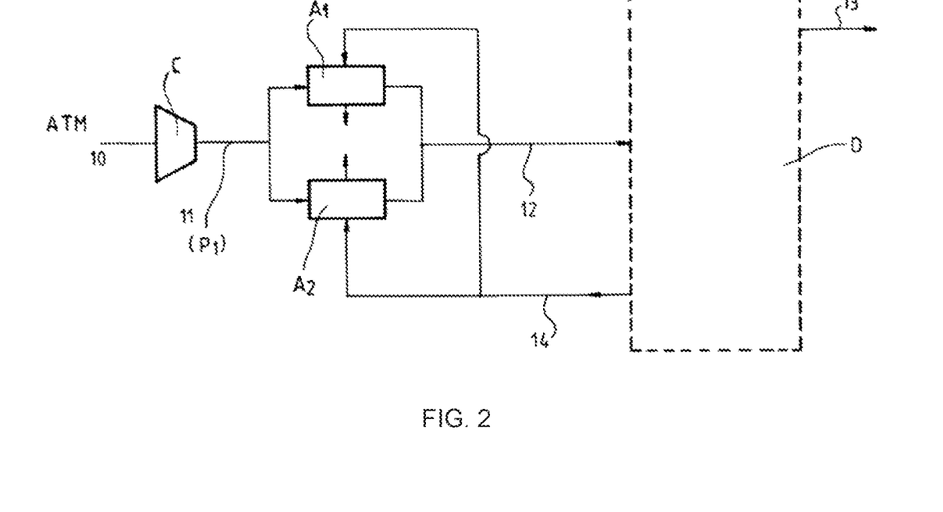
FIG. 2 provides an embodiment of the present invention.

FIG. 2 is a schematic representation of the hot part of the air separation unit. The atmospheric air 10 containing the various pollutants to be removed is compressed by means of the compressor C to the pressure P1, of the order of 1.5 bar abs, and this compressed air 11 is introduced into one of the adsorbers of the TSA (A1 or A2). After purification this purified air 12 is sent into the downstream part of the unit, which comprises in particular the cryogenic fractionation unit D. The regeneration gas 14 originates from this fractionation unit. It is generally impure nitrogen (that is, containing argon and oxygen) at low pressure, close to atmospheric pressure. This gas—or a fraction of this gas—is heated using one or more heat exchangers (steam, electric, by heat recovery from other fluids, etc.) during the heating step and is then used for cooling the adsorber. The output 13, generally impure oxygen (90-98%) in the case under consideration, is sent to a downstream unit, not shown.

Here, fixed bed is given to mean that the adsorbent, whether in the form of particles (beads, sticks, granules, wafers, etc.) or structured adsorbent such as for example monolithic, is immobile in a casing that is itself immobile. This excludes any solution in which the adsorbent is mobile and in particular any rotary system such as rotary contact or barrel systems (process in which it is the casings containing the adsorbent that are mobile).

Another essential point according to the invention is that the fluids circulate horizontally through the adsorbent mass. The mass can thus be held between two gas-porous vertical walls for which the spacing tolerances can be very small. Very thin, very uniform bed thicknesses can thus be obtained. As already indicated, it is practically impossible to reach this level of precision with a flat adsorbent bed having a large free surface.

Likewise, with this geometric configuration, it can be easy to obtain dense, uniform filling of the adsorber without having to use a complex filling system.

It will also be noted that in our case, the gas circulation in the inlet/outlet zones can equally well be vertical, horizontal or even more complex, for example with multiple inlet points. In any case, after distribution, circulation is necessarily horizontal through the adsorbent layers. Due to the design of the adsorber, the direction of circulation in the free volumes and through the adsorbent mass are completely unrelated.

Figure 3:
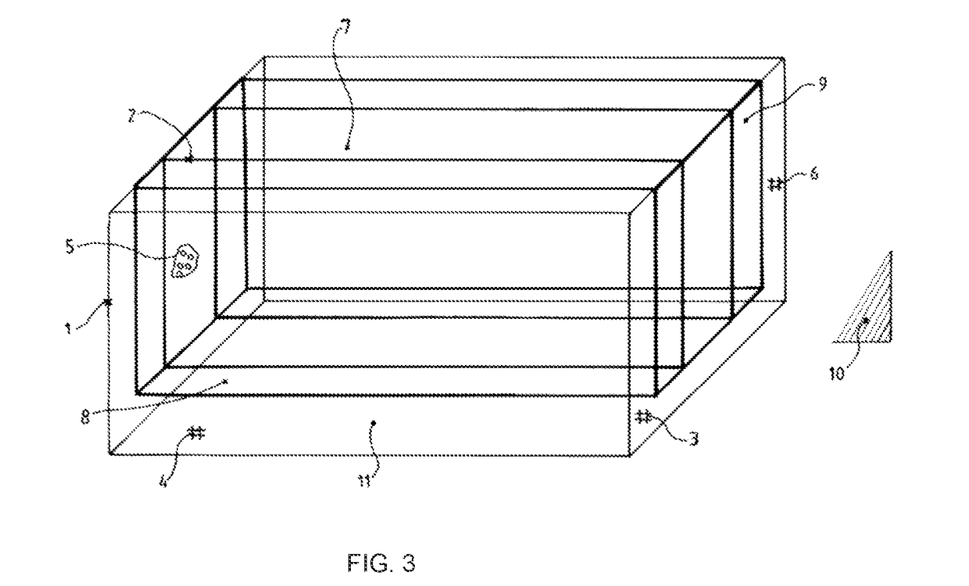
FIG. 3 illustrates an example of an arrangement of the set of volumes used in the plant according to an embodiment of the invention.

FIG. 3 illustrates an example of an arrangement of the set of volumes used in the plant according to the invention. The external adsorber casing 1 is shown in thin lines, while the internal part of the set of volumes (internal part) 2 is arbitrarily shown in thick lines. The adsorber casing is essentially parallelepipedal. "Essentially parallelepipedal" is given to mean that in practice, the adsorber casing and the internal part have six flat faces and have the appearance of a parallelepiped with faces at right angles, but that there can be reinforcements, locally at least one internal or external layer of insulation, and obviously pipes or boxes for introducing and withdrawing air and regeneration gas. The adsorber is placed flat on the ground in its operating position, and the length thereof is denoted as L, the width l and the height H. In the context of the invention, it is not important whether these are external or internal dimensions.

Each of the parallelepipeds used is therefore defined by its three dimensions, namely H*L*l for the external adsorber casing and H'*L'*l' for the internal part. The horizontal faces, floor and ceiling, are therefore identified by their dimensions L*l and L'*l' (reference sign 3, for example). The larger vertical faces are respectively identified as H*L and H'*L' (reference sign 4, for example). For the internal part, these faces H'*L' are fluid-porous (reference sign 5, for example). The other smaller vertical other faces are then denoted H*l and H'*l' (reference sign 6, for example).

The parallelepiped H'*L'*l' forming the internal part is itself divided into three sub-volumes, all parallelepipedal. The central volume V1 7 is a free volume suitable for the circulation of the fluids. On either side of V1 are the adsorbent masses housed in the two parallelepipeds V2 and V3 8 and 9. The internal part is symmetrical relative to its vertical mid-plane, which is shown schematically to the right of the sketch of the adsorber and has reference sign 10. This mid-plane 10 is also the mid-plane of the adsorber casing. The adsorber as a whole therefore has a plane of symmetry 10. As a result, each of the adsorbent masses will treat 50% of the air flow and be regenerated by 50% of the regeneration gas flow. All of the fluids circulate horizontally through the adsorbent through the faces H'*L', which are the only porous faces. This circulation takes place from the central free volume V1 of the internal part towards the free volumes V4 and V5 of the casing (reference sign 11, for example) and vice versa.

In the arrangement applied in FIG. 3, the internal part is the same length as the casing (L'=L) but lower (H'<H). The top face of said internal part adjoins the top face of the casing, that is, they have a common ceiling. There is therefore a space between the floor of the internal part and the floor of the casing that places the volumes V4 and V5 in fluid communication, this assembly then forming the free volume of the casing. This is one of the possible configurations between the casing and the internal part. Other options will be described below. FIG. 3 is therefore merely a non-limiting example of the possible configuration of the adsorber according to the invention, selected to explain the embodiment principle.

According to a preferred variant, volumes V2 and V3 of the internal part each include a plurality N (N between 1 and 4, preferably N=2) of adjacent sub-volumes, and each of these volumes can contain an adsorbent with a different property, all of these adsorbents being arranged symmetrically relative to the mid-plane of the adsorber. Very generally, the different adsorbents are separated by fluid-porous vertical walls (H'*L') that hold them and prevent them from mixing. It will however be noted that it is possible to put the different adsorbents in place with a movable wall that is gradually raised during filling and that is, as appropriate, removed or left in place at the end.

In the context of the invention, a first adsorbent will for example be used that is suitable for removing the great majority of the water and optionally some of the CO2 (activated alumina, silica gel, doped alumina, etc.) and a second adsorbent suitable for removing the remaining CO2, the nitrogen oxides and certain hydrocarbons (X zeolites, preferably exchanged particularly with calcium and/or barium). A single bed (doped alumina, X zeolite) or three successive beds (for example alumina, X zeolite, exchanged zeolite) can equally be used.

In a first configuration, shown schematically in the cross-section 4 A in FIG. 4 (which is a side view of the adsorber cut in half vertically), the adsorber is produced so that the vertical walls (H'*L') relative to the adsorbent volumes are sealably fixed, at the top and bottom, to the top wall and the bottom wall of the adsorber casing respectively. This configuration is simple and gives the assembly rigidity, but it must be checked whether the operating conditions result in excessive mechanical stresses. This will depend mainly on the materials used, the type of fixing between the walls and the temperature used during regeneration. This temperature depends on the adsorbents used, the regeneration flow available and the residual impurity content in the adsorbent selected for the design. With a regeneration temperature of 60 to 90° C. for example, such a configuration can be possible. It will be less easy to implement with temperatures of 150 to 250° C.

Figure 4A:
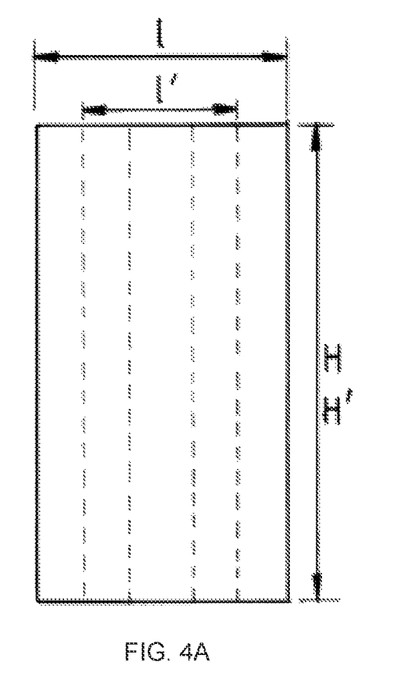
FIG. 4 provides a side view of the adsorber cut in half vertically in accordance with an embodiment of the present invention.

It will be noted that a single bed of adsorbent has been shown for the sake of simplicity. In most cases, there will be an intermediate porous wall on each side, suitable for separating two different adsorbents.

For any problems linked to the temperature, it might be necessary to provide a degree of freedom to permit vertical movements of the porous vertical walls holding the adsorbents.

Figure 4B:
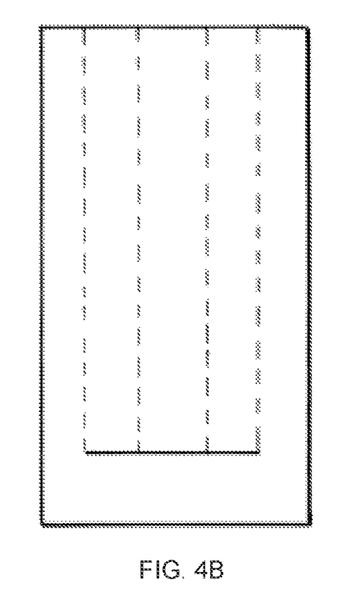

According to other embodiments, the adsorber is thus produced so that the vertical walls (H'*L') of the adsorbent volumes are sealably fixed at the top to the top wall of the adsorber casing and at the bottom to a solid end—or floor—going from the external wall of one adsorbent volume to the external wall of the other volume as shown in cross-section 4 B.

It can then be seen that there is a space between said solid end and the bottom wall of the adsorber casing forming an additional free volume in fluid communication with the two lateral free volumes (V4 and V5) and contributing to the formation of the free volume of the adsorber.

Figure 4C:
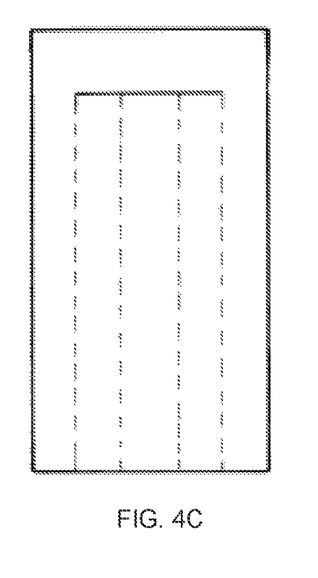

In a reverse configuration (cross-section 4 C), the vertical walls (H'*L') of the adsorbent volumes are sealably fixed at the top to a solid end—or ceiling—going from the external wall of one adsorbent volume to the external wall of the other volume and at the bottom to the bottom wall of the adsorber casing and there is then a space between said ceiling and the top wall of the adsorber casing forming an additional free volume V2d in fluid communication with the two lateral free volumes (V4 and V5) and contributing to the formation of the free volume of the adsorber.

Figure 4D:
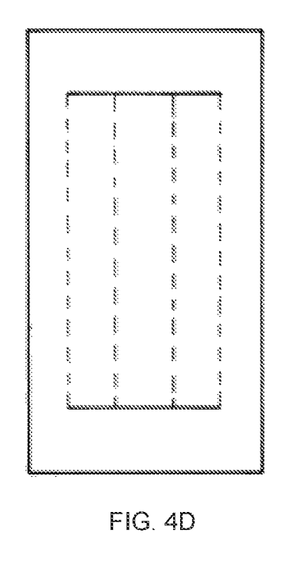

Finally, according to another embodiment (4 D), the vertical walls (H'*L') of the adsorbent volumes are sealably fixed at the top and bottom to solid ends—ceiling and floor respectively—going from the external wall of one adsorbent volume to the external wall of the other volume and at the bottom to the bottom wall the adsorber casing. In this case, there is a space between said ceiling and the top wall of the adsorber casing and between said floor and the bottom wall of this same casing forming an additional free volume in fluid communication with the two lateral free volumes (V4 and V5) and contributing to the formation of the free volume of the adsorber.

The mechanical strength of the internal part in the casing can be improved by supports, for example on the bottom part, or hanger systems, for example on the top part. These holding means can have a certain flexibility in order to follow any movements linked to the thermal expansion and contraction mentioned above. Said means can preferably be discrete or, at least, discontinuous, and not prevent fluids from passing from one zone to the other.

Likewise, there are different configurations with respect to the lateral walls (H'*l') of the internal part.

According to a first embodiment, at least on one side, the lateral ends of the vertical walls of the adsorbent volumes are sealably fixed over their entire height (H') to the lateral walls (H*l) of the adsorber casing.

According to a second embodiment, at least on one side, the lateral ends of the vertical walls of the adsorbent volumes are sealably fixed over their entire height (H') to a solid plate (H'*l').

Figure 5A:
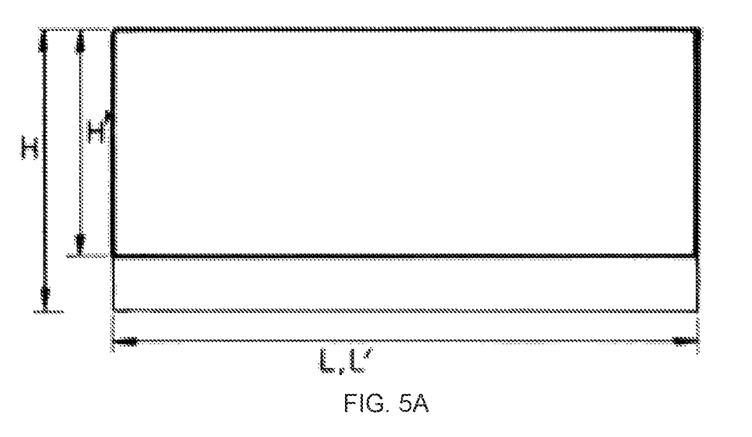
FIG. 5 provides a series of longitudinal cross-sections shown schematically in accordance with an embodiment of the present invention.
Figure 5B:
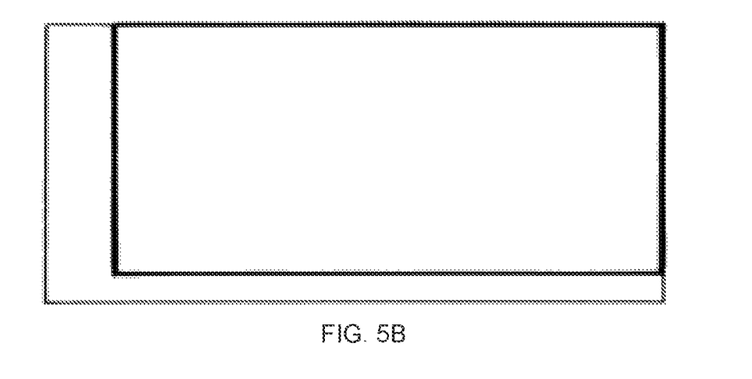
Figure 5C:
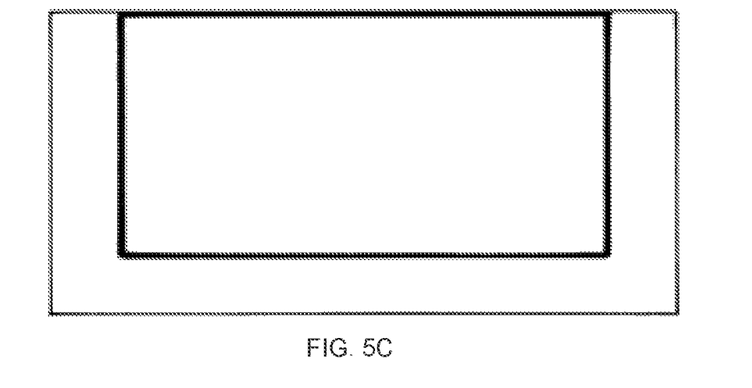

A series of longitudinal cross-sections is shown schematically in FIG. 5. The internal part, shown arbitrarily in thick lines, is assumed to be fixed to the casing by its top part but to have its own floor. Cross-section 5 A shows an internal part adjoined to the casing by its two lateral sides, 5 B by a single side, the other being closed by a flat end, and 5 C an internal part having its own two ends.

As above, there is a space between each solid plate fixed to the internal part and the adjacent lateral wall of the adsorber casing forming an additional free volume in fluid communication with the two lateral free volumes (V4 and V5) and contributing to the formation of the free volume of the adsorber.

These free volumes allow the fluids to circulate and promote a good balance between the flows going to each of the two adsorbent masses. In addition, these free volumes can make it possible to house very efficient distribution systems, allowing almost perfect distribution of all of the streams through the adsorbents. An example of this type of device will be given below.

According to a preferred variant, volumes V2 and V3 containing the adsorbent mass include, over the entire length of their top end, a system suitable for avoiding the local potential pollution of the purified air linked to a bypass or to a local excess flow or to a regeneration fault.

As the fluids circulate horizontally in the adsorbers, some of the constraints specific to radial adsorbers are experienced, and in particular the need to avoid the premature breakthrough of the impurities in the top part of the adsorber.

Said breakthrough can originate from a bypass or a local excess air flow and/or a regeneration fault.

The bypass can originate from the compaction of the adsorbent. These problems are well known to a person skilled in the art and previously developed solutions can be applied here. In particular, due to its geometry, using a parallelepipedal adsorber simplifies the implementation of the solutions devised for radial beds (dead zone filled to a sufficient height with adsorbent, equivalent system to the cones, etc.). Again, it must be noted that filling is also simplified and that it is easy here to obtain dense, uniform filling by spraying, limiting both the compaction and the risk of uneven density in the beds. Due to the simple geometry, a balloon can for example be used, inflated to a pressure greater than P1, forming a seal above the free surface of the adsorbents. A membrane can also be applied permanently to the free surface of the adsorbents through slight overpressure relative to the operating pressure. This overpressure can originate from a fluid, for example instrument air, or a heavy material. Again, the solutions developed for the radial adsorbers of units for the production of oxygen by adsorption, which are described in the literature or patents filed, must be adapted. One of these solutions is described in greater detail in the example given at the end of this document.

As the implementation of sealing systems in the top part and filling are simplified, the use of adsorbents in their most common form, namely sticks, beads, crushed material, pellets and more generally particles, will preferably be applied. It must however be noted that the geometry of the parallelepipedal beds is particularly well suited to the use of monoliths in the form of bricks. Although this solution does not seem technically and economically beneficial at present, it could advantageously be used in the future.

Currently, at least one and preferably all of the adsorbents used in the process will be in the form of particles.

Given the geometry adopted for the adsorber, the process according to the invention will be such that both the central volume V1 of the internal part and the free volume of the casing have means making it possible to introduce and extract the different fluids circulating in the adsorber (air to be purified, treated air intended for the cryogenic separation unit, regeneration gas originating from said unit, very generally low-pressure nitrogen).

More specifically, the arrangement of the internal part in the casing with its optional flat ends, and the layout of the means making it possible to introduce and extract the different fluids circulating in the adsorber requires that said fluids only circulate horizontally through the adsorbent masses between the inlet and the outlet of said adsorber.

As in all adsorbers intended to remove almost all of the impurities from a fluid, it must be ensured that the connections between elements are fluid-tight by applying the appropriate technologies (welding, flanges, gaskets, etc.).

According to a preferred arrangement, the air to be treated enters via volumes V4 and V5 and the purified air leaves via volume V1 and as a result, the regeneration gas enters via volume V1 and leaves via volumes V4 and V5. The benefit of this arrangement comes from the TSA process as currently implemented at least in air purification units upstream of cryogenic separation units. Without wishing to go into detail here, it should be known that in this type of unit, during regeneration it is usual to only input the quantity of heat strictly necessary for the desorption of the impurities so that the heat front does not leave the adsorbent. Reference can for example be made in this regard to EP 1 080 773 for a more comprehensive explanation of the control of the heating time. This means that the entire (or almost the entire) external casing remains at a temperature close to that of the incoming air and the heat front only passes through the internal part. In the configurations in which one face of the internal part adjoins the wall of the casing or is very close to it, it can be beneficial to use insulating means in order to limit the heat transfers. These means could be on the side of the internal part, and/or on the side of the casing and/or optionally between the internal part and the casing. Such insulation will not always be necessary, in particular if there is a significant flow of regeneration gas. In this case, a regeneration temperature substantially lower than 100° C. is acceptable, of the order of 50 to 80° C. In this case, the heat losses will be naturally low and the thermal stresses linked to expansion will be limited. Conversely, the use of regeneration temperatures of 150° C. and more will require a more detailed examination of the resulting stresses. Depending on the location of the inlet for the air to be purified, and in particular if it has been substantially cooled in order to facilitate the adsorption of the impurities, some parts of the adsorber could optionally be insulated in order to retain this advantage.

According to a preferred embodiment, the central volume V1 of the internal part comprises a filter that makes it possible to treat the purified air before sending it to the cryogenic separation unit. This filter makes it possible to remove any dust generated by the adsorbent(s). This filter will preferably be self-cleaning, that it, the regeneration gas will pass through it counter-currently and dislodge any dust captured during the preceding step. There is then generally a purge valve at the low point that makes it possible to discharge said dust periodically. This filter can be produced in a number of ways. Taking the arrangement in FIG. 5 B, FIG. 6 shows some of these options. These are cross-sections along the mid-plane of symmetry of the adsorber. Reference sign (20) corresponds to the casing, (21) to the internal part, (22) to the purified air outlet and regeneration gas inlet pipe, (23) to the part of this pipe that passes sealably through the free volume of the casing, (24) to the part of this pipe belonging to the internal part and (25) to the filtration zone(s).

The pipe and filter are shown in thick lines. The cross-section of the pipe can be any shape (circular, triangular, rectangular, etc.).

Figure 6A:
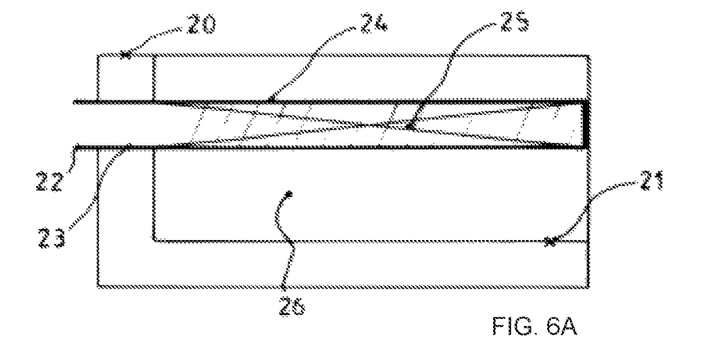
FIG. 6 provides a various options for producing a filter in accordance with several embodiments of the present invention.

In FIG. 6 A it is the pipe itself that passes through the free volume V1 (26) that acts as a filter. In this zone, it is for example perforated and surrounded by a fabric allowing filtration to 50 microns. It can also be a commercial filter fixed in the extension of the pipe, which then stops when it emerges into the volume V1. The pipe, or the commercial filter, can have a tapered internal packing element in order to improve the distribution of the fluids over their entire length.

Figure 6B:
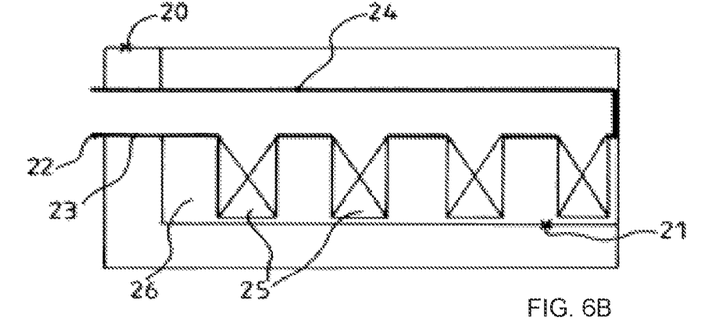
Figure 6C:
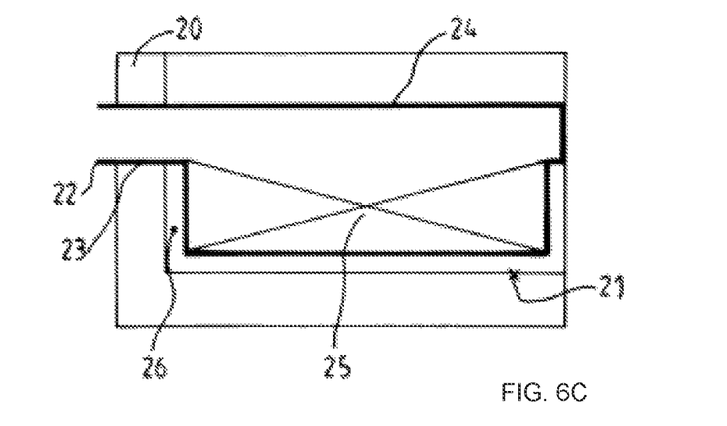

In the case shown in FIG. 6 B, a plurality of commercial filters (25) fixed to the pipe (24) is used. This can make it possible to improve the distribution of the fluids through the adsorbent masses by distributing the fluid injection points in the free volume V1. Finally, in FIG. 6 C, an efficient fluid distribution system is associated with filtration. It will be noted that such a distribution system can be installed independently of the filtration function. There can be two perforated walls installed on either side of the vertical mid-plane, in the free volume V1 and a certain distance from the porous walls holding the adsorbent. By creating an additional head loss, this system can allow almost perfect distribution of the gas in the adsorbent masses.

In a further preferred configuration, the means for introducing and extracting the fluids into and from the volumes V1, V4 and V5 are on a single face (H*l) of the parallelepipedal adsorber casing. This makes it possible to group together all of the adsorber inlets and outlets in order to facilitate connections to the equipment external to the adsorber itself (valves, exchanger, etc.).

Figure 7A:
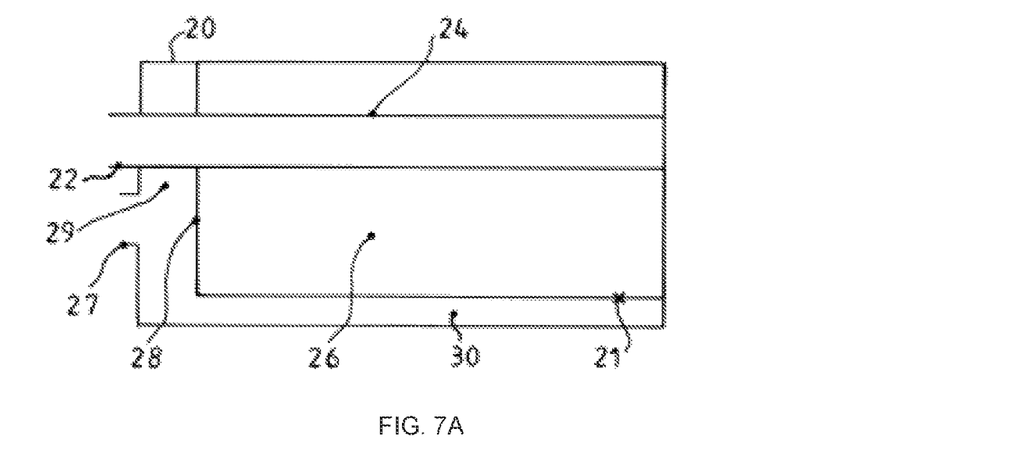
FIG. 7 provides an embodiment of the present invention.
Figure 7B:
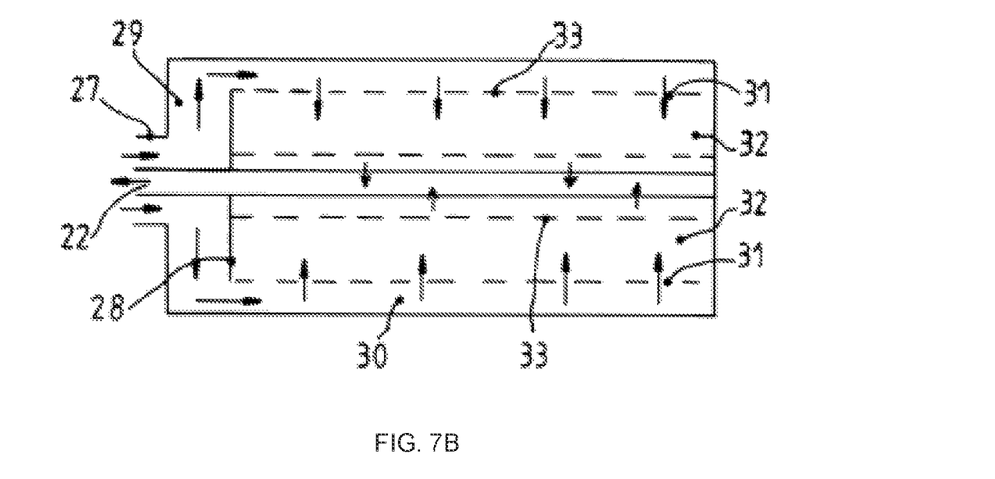

FIG. 7 shows such a layout. The arrangement in FIG. 5 B is applied again, namely an internal part adjoining the casing by its top face and one side, with a simple pipe entering the free volume V1 as shown in FIG. 6 A. The same reference signs as in this cross-section are used. In FIG. 7 A, which is a cross-section along the vertical mid-plane of the adsorber, the air to be purified arrives through the pipe 27 and enters the adsorber casing. The end 28 of the internal part acts as a deflector and distributes the air stream in the free volume 29 between the wall of the casing and said end. FIG. 7 B is a schematic top view illustrating the circulation of the air in the adsorber. After circulating in the free volume 29, the air enters the two free volumes V4 and V5, identified by reference sign 30, passes through the porous walls holding the adsorbent, then the adsorbent masses, comes back out through the central porous walls, enters the discharge pipe and leaves the adsorber 22.

The most conventional TSA purification units include two identical adsorbers, one being in the production phase while the second is in the regeneration phase. The various flows are then guided and extracted from the adsorbers by a set of valves that make it possible to carry out the purification cycle in accordance with the process used. All of these elements are connected by pipes. The valves, pipes and other ancillary equipment such as instrumentation, connecting cables, instrument air inlet, etc., are often supported by a single structure generally known as a "valve skid".

According to the invention, the TSA unit implemented comprises, on either side of a central zone, two adsorbers as described above, installed symmetrically, with their inlets/outlets facing the central zone, and said central zone comprises means for distributing or recovering the various flows of the process such as valves, pipes, etc., that is, this central zone corresponds to what has been named the valve skid.

In a preferred variant embodiment, the two adsorbers and the valve skid of the central zone are aligned and form a single large parallelepiped with a height Ht and a width lt, and the length Lt of which is equal to the sum of the lengths of the two adsorbers and the length of the central zone.

Figure 8:
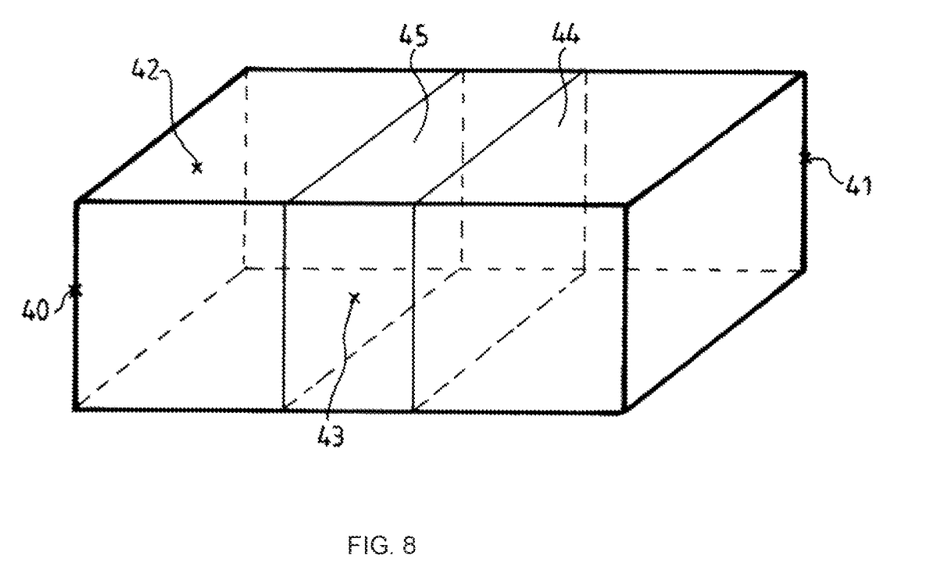
FIG. 8 provides an embodiment of the present invention.

More specifically, provision is made for the height Ht of this large parallelepiped to be essentially equal to the height H of one adsorber and for its width lt to be essentially equal to the width l of one adsorber. As a result, a compact unit is obtained that can form a whole and the full benefits of which will be disclosed below. FIG. 8 shows in thick lines the large parallelepiped 40 corresponding to the complete purification unit and comprising a first adsorber 41 as described above with its inlets and outlets through its lateral face 44. On the opposite side is the second adsorber 42, produced symmetrically to the first and the inlets and outlets of which are therefore through its lateral face identified by reference sign 45. The central part 43 corresponds to the valve skid, the role of which was explained above.

In a further preferred embodiment, the central part also contains the regeneration heater. According to the method applied for purification, said central part can also house the aftercooler of the air to be purified and a separator vessel for separating and then removing the condensates so that all of the equipment corresponding to the "air purification" function is in the large parallelepiped.

The benefit of producing an air purification unit as described above relates to the possibility of having at least one common base for the different parts (the two adsorbers and the valve skid) and being able to transport it as a whole after construction in a workshop, for example. To this end, and depending on the size of the associated air separation unit, the parallelepiped therefore comprising the two adsorbers and the central zone has a length of between 3 and 12 meters, a height H of between 1 and 3 meters and a width l of between 1 and 3 meters.

Due to its dimensions, the TSA can have the following additional features:
- the parallelepiped comprising the two adsorbers and the central zone is contained in a structure in accordance with the ISO standards relating to containers and also including the handling systems in accordance with these ISO standards (often referred to as "ISO corners"). The TSA is then in a specific structure to be produced in a workshop, which can optionally use part of a standard ISO container. The benefit of complying with ISO standards is that it greatly facilitates handling and transportation. Any reinforcements making the assembly mechanically pressure resistant will be contained within the standard dimensions of the containers.
- the parallelepiped comprising the two adsorbers and the central zone is contained in an ISO container.
- at least part of the structure of the container acts directly as a structure for the adsorbers and/or the central zone.

The external structure of the TSA is then an actual container. At least one of the walls of the container (lateral, bottom or top wall) can act directly as a wall for the external adsorber casing. Preferably, several walls of the container are used in this way.

Given the low pressures at play in purification and in some cases temperatures remaining close to ambient temperature, a variety of materials can be used for the TSA. These will mainly be metallic materials (carbon steel, stainless steel, aluminum, etc.) and/or polymeric materials. In some parts, low thermal expansion materials such as Invar can be used. Construction will take place entirely in the workshop, with only the connections of the different fluids being made on site. The adsorbent filling will preferably also take place in the workshop.

The invention will now be illustrated using the example below.

It relates to an oxygen production unit producing of the order of 100 t/d (tonnes/day) for which an air flow rate of 15,000 Nm3/h is used. The pressure P1 on leaving the first compression stage is 1.3 bar abs. This air is cooled to 3° C. by means of a refrigerating unit in order to limit the quantity of water vapor carried to purification and in order to reduce the adsorption temperature. Here, this temperature is in the low range of the temperature levels used. It was selected mainly due to the low value of P1. Temperatures of 5 to 8° C., or even more, could be adopted, particularly if the pressure P1 was slightly higher. The final decision is based on a general cost analysis. The adsorption time applied is 150 minutes, resulting in a cycle time of 5 hours given that the purification unit usually comprises two adsorbers, one being in production while the other is in regeneration. Here, these conventional times could be reduced. The cryogenic process applied results in the availability of a significant waste gas flow that can be used for regeneration, which would potentially make it possible to shorten the usual heating and cooling times. In addition, the depressurization and repressurization steps are almost unnecessary given the respective production (1.3 bar abs) and regeneration (1.03 bar abs) pressures. However, the small thickness of the beds of activated alumina and zeolite, of the order of 0.25 m, did not result in possible optimization being taken further. Production times of 120, 90 or even 60 minutes can be envisaged with air to be purified optionally introduced at a temperature greater than the 3° C. applied in this example. Given the large amount of energy involved in head losses at low pressure, installing an element for regulating the regeneration flow rate based on optimization of the head loss throughout said step can be envisaged. In other words, more flow is taken when the adsorber is relatively cold, for example at the start of heating and the end of cooling, and less flow is taken when conversely it is, on average, hottest. In a simpler manner, a first heating flow rate and a second higher flow rate during cooling can be imposed, or in a slightly more complex manner, the regeneration time can be divided into three or four steps for example with changes in flow rate (start of heating/heating-start of cooling/end of cooling).

The total adsorbent volume is of the order of 6 m3 split practically in half between activated alumina and zeolite X exchanged with calcium and barium, a particularly effective adsorbent for capturing traces of hydrocarbons and nitrogen oxides.

Figure 9:
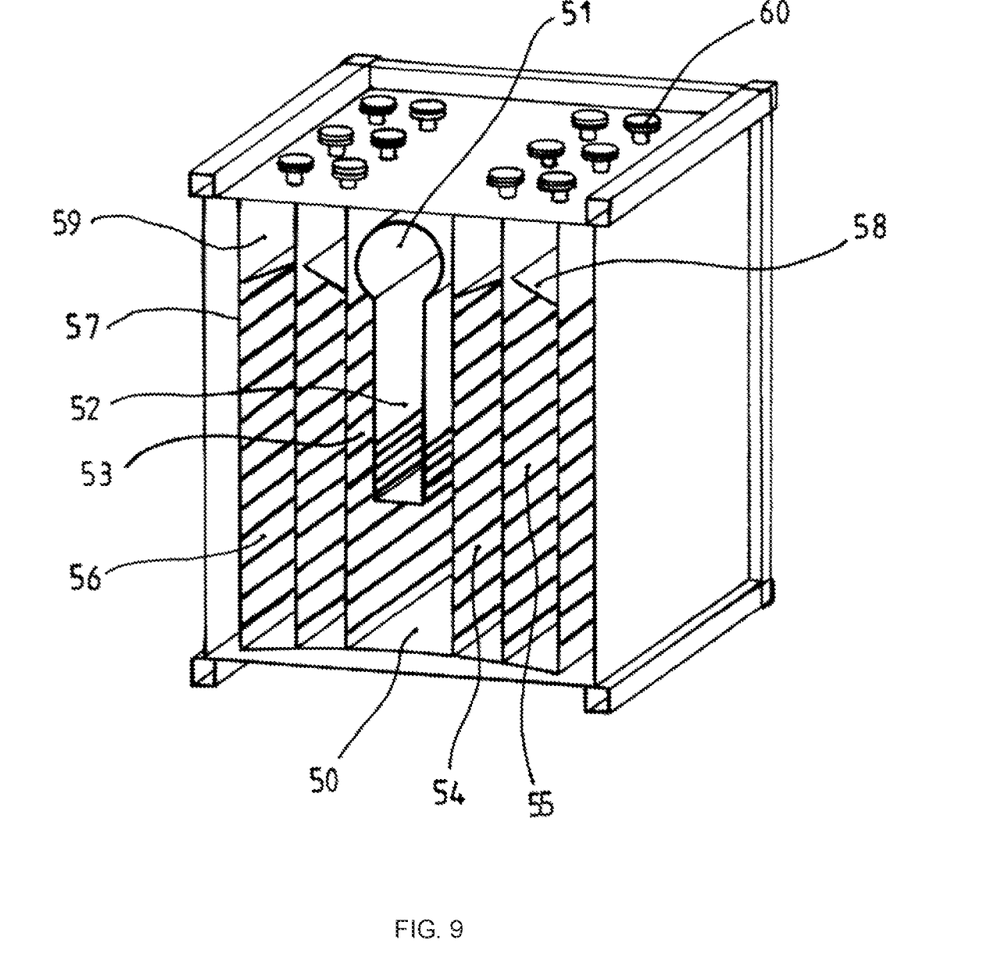
FIG. 9 provides an embodiment of the present invention.

According to the invention, each adsorber is parallelepipedal, with a length L equal to approximately 3 m, a height H equal to approximately 3 m, and a width l equal to approximately 2.00 m. FIG. 9 shows a perspective cross-section of said adsorber. In the center is the volume V0 suitable for the distribution of the fluids 50 with the purified air outlet and regeneration gas inlet pipe 51. The bottom part of this pipe, which passes through the adsorber, is open and communicates with the filter 52. This filter also acts as a flow divider. On either side of the filter is the first porous wall 53 that holds the zeolite bed. The zeolite bed 54 is approximately 0.25 m deep (wide). It is separated from the activated alumina by a second porous wall 55. The alumina bed 56 is approximately 0.25 m wide. It is held by the last porous wall 57, which separates it from the free volume of the casing.

The working height of adsorbent is 2.1 m. An anti-pollution system 58 is provided in the top part with an adsorbent reserve 59 in order to compensate for compaction and a series of pipes 60 for filling the adsorbent volumes with activated alumina and zeolite respectively. The anti-pollution system applied here is directly transposed from solutions developed for radial adsorbers. Without going into detail, it can be said that it is an upwardly-sloping metal sheet 58 welded all along one side to a porous wall and leaving a space of a few centimeters on the other side allowing the flow of the adsorbent particles.

A solid wall (not shown) must be imagined where the pipe passes through, isolating the internal part from the free volume of the external casing. The air to be purified is introduced into the casing in the center of the wall of the casing and strikes the solid wall (not shown) just mentioned. This acts as a deflector and ensures distribution in all directions. The actual principle of the circulation of the fluids was described above.

As initially stated, this purification unit is situated upstream of a cryogenic air separation unit. This unit can in particular be well suited to low-pressure oxygen production, and in particular to impure oxygen with a purity rate of between 90 and 98%.

Given the footprint constraints that are set in this case in order to take full advantage of the principle of the invention, such a TSA will only be suited to oxygen production of a maximum of a few hundred tonnes. It could however be cost-effective to use several TSA modules of this type to feed a larger cryogenic unit. These modules could then operate in parallel or, if beneficial, with phase offset.

The process described in this application is limited to the stated use, namely aerial gas separation. However, the principle of an adsorber of the type described herein and operating at low pressure, of the order of 1.10 to 1.5 bar abs for example, could have other applications, in particular in the field of CO2 capture.

The plant according to the invention also makes it possible to produce small units, that is, from several tens to several hundreds of tonnes per day of oxygen, competitively. The compression means 1 could then be common to several units, optionally of different types (boosted air for combustion, for ventilation, etc.).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A plant for aerial gas separation comprising, in the direction of circulation of the air stream:
   a. compression means that make it possible to compress the air stream to a pressure P1 of between 1.15 bar abs and 2 bar abs;
   b. a TSA unit; and
   c. a cryogenic distillation unit,
   wherein the TSA unit comprises at least two adsorbers A1 and A2 each having a parallelepipedal casing arranged horizontally and comprising:
   an air stream inlet and outlet;

two fixed bed adsorbent masses, each also parallelepipedal; and a set of volumes allowing the air stream to pass through the two adsorbent masses horizontally, in parallel, over the entire cross-section of each of the adsorbent masses and throughout their thicknesses, wherein the set of volumes comprises:

an internal part comprising:

a first volume V1 for the introduction and destruction or recovery of fluids;

a second volume V2 and a third volume V3 each comprising an adsorbent mass and situated on either side of the first volume V1; and a free part comprising two volumes V4 and V5 for the introduction and distribution or recovery of fluids located on either side of the internal part and between the internal part and the adsorber casing;

wherein the internal part is arranged symmetrically relative to the mid-plane of the adsorber casing, wherein the internal part has a solid bottom end and/or a solid top end and the first volume V1, the second volume V2 and the third volume V3 have vertical walls sealably fixed to the top wall of the adsorber casing or to the solid top end and to the bottom wall of the adsorber casing or to the solid bottom end.

2. The plant as claimed in claim 1, wherein said plant comprises, between the compression means and the cryogenic distillation unit, a single adsorption unit.

3. The plant as claimed in claim 1, wherein second volume V2 and the third volume V3 each comprise at least two adjacent sub-volumes comprising different adsorbents, with all of the adsorbents arranged symmetrically relative to the mid-plane of the adsorber.

4. The plant as claimed in claim 1, wherein the first volume V1, the second volume V2 and the third volume V3 have vertical walls sealably fixed to the top wall and the bottom wall of the adsorber casing.

5. The plant as claimed in claim 1, wherein the set of volumes comprises, between the bottom wall of the adsorber casing and the solid bottom end, a space in fluid communication with volumes V4 and V5.

6. The plant as claimed in claim 1, wherein the top wall of the adsorber casing and the solid top end, a space in fluid communication with volumes V4 and V5.

7. The plant as claimed in claim 1, wherein the first volume V1, the second volume V2 and the third volume V3 have vertical walls sealably fixed to at least one lateral wall of the adsorber casing.

8. A process for aerial gas separation from an air stream containing at least one impurity selected from water vapor, carbon dioxide, nitrogen oxides and hydrocarbons, using the plant as defined in claim 1 and comprising the following successive steps:

a) compressing the air stream to a pressure P1 of between 1.15 bar abs and 2 bar abs;

b) purifying the compressed air stream, by adsorption using the TSA unit so as to remove at least one impurity contained in the air stream; and c) separating the constituents of the air stream by cryogenic distillation using the unit, wherein all of step b) are carried out at the pressure P1, wherein in step b) the air stream is introduced into the two volumes V4 and V5 and the purified air stream is withdrawn from volume V1.

9. The process for aerial gas separation as claimed in claim 8, wherein the pressure P1 is between 1.15 bar abs and 1.5 bar abs.

10. The process for aerial gas separation as claimed in claim 8, wherein the set of volumes comprises, between the bottom wall of the adsorber casing and the solid bottom end, a space in fluid communication with volumes V4 and V5, and in step b) the air stream is introduced into space in fluid communication with volumes V4 and V5 and the purified air stream is withdrawn from volume V1.

11. The process for aerial gas separation as claimed in claim 8, wherein the top wall of the adsorber casing and the solid top end, a space in fluid communication with volumes V4 and V5, and in step b) the air stream is introduced into space in fluid communication with volumes V4 and V5 and the purified air stream is withdrawn from volume V1.

12. The process for aerial gas separation as claimed in claim 8, wherein the process comprises a step d) of regeneration of the TSA unit in which the gas is introduced into volume V1 and then withdrawn from the two volumes V4 and V5.

13. The process for aerial gas separation as claimed in claim 8, wherein the set of volumes comprises, between the bottom wall of the adsorber casing and the solid bottom end, a space in fluid communication with volumes V4 and V5, and comprises a step d) of regeneration of the TSA unit in which the gas is introduced into volume V1 and then withdrawn from the space in fluid communication with volumes V4 and V5.

14. The process for aerial gas separation as claimed in claim 8, wherein the top wall of the adsorber casing and the solid top end, a space in fluid communication with volumes V4 and V5, and comprises a step d) of regeneration of the TSA unit in which the gas is introduced into volume V1 and then withdrawn from the space in fluid communication with volumes V4 and V5.

15. A plant for aerial gas separation comprising, in the direction of circulation of the air stream:

a. compression means that make it possible to compress the air stream to a pressure P1 of between 1.15 bar abs and 2 bar abs;

b. a TSA unit; and c. a cryogenic distillation unit, wherein the adsorption unit comprises at least two adsorbers A1 and A2 each having a parallelepipedal casing arranged horizontally and comprising:

an air stream inlet and outlet;

two fixed bed adsorbent masses, each also parallelepipedal, the faces of which are parallel to the faces of the casing; and a set of volumes allowing the air stream to pass through the two adsorbent masses horizontally, in parallel, over the entire cross-section of each of the adsorbent masses and throughout their thicknesses, wherein the set of volumes comprises:

an internal part comprising:

a first volume V1 for the introduction and distribution or recovery of fluids;

a second volume V2 and a third volume V3 each comprising an adsorbent mass and situated on either side of the first volume V1; and a free part comprising two volumes V4 and V5 for the introduction and distribution or recovery of fluids located on either side of the internal part and between the internal part and the adsorber casing;

wherein the internal dart is arranged symmetrically relative to the mid-plane of the adsorber casing, wherein the first volume V1, the second volume V2 and the third volume V3 have vertical walls sealably fixed to at least one solid plate parallel to a lateral wall of the adsorber casing.

16. The plant as claimed in claim 15, wherein set of volumes comprises, between the solid plate and a lateral wall of the adsorber casing, a space in fluid communication with volumes V4 and V5.

* * * * *